United States Patent [19]

Pedersen et al.

[11] 4,011,755
[45] Mar. 15, 1977

[54] ACOUSTIC FLOWMETER

[75] Inventors: Norman E. Pedersen, Wilmington; James E. Bradshaw, Tyngsboro, both of Mass.

[73] Assignee: Panametrics, Inc., Waltham, Mass.

[22] Filed: Oct. 23, 1975

[21] Appl. No.: 625,170

[52] U.S. Cl. .................................. 73/194 A
[51] Int. Cl.² .................................. G01F 1/66
[58] Field of Search ........................ 73/194 A

[56] References Cited

UNITED STATES PATENTS

| | | | |
|---|---|---|---|
| 2,746,291 | 5/1956 | Swengel | 73/194 A |
| 3,050,997 | 8/1962 | Lake | 73/194 A |
| 3,473,378 | 10/1969 | Yoshiyama et al. | 73/194 A |
| 3,631,719 | 1/1972 | Charvier et al. | 73/194 A |
| 3,738,169 | 6/1973 | Courty | 73/194 A |
| 3,935,737 | 2/1976 | Lee | 73/194 A |

*Primary Examiner*—Charles A. Ruehl
*Attorney, Agent, or Firm*—Kenway & Jenney

[57] ABSTRACT

In the acoustic flowmeter apparatus disclosed herein, repetitively gated bursts of relatively high frequency acoustic energy are transmitted between upstream and downstream transducers in a conduit in which flow is to be measured, the transmission being alternately in an upstream and a downstream direction. The received signals are amplified and subjected to narrow band filtering so as to extract an essentially continuous component at the high frequency, preserving phase information. By measuring the relative phase shifts of the upstream and downstream transmissions, a measurement proportional to flow rate is obtained. In the preferred embodiment, the sum of the transit times is measured by measuring the phase shifts of the principal repetition frequency modulation component of the received signals.

8 Claims, 3 Drawing Figures

ACOUSTIC FLOWMETER

BACKGROUND OF THE INVENTION

This invention relates to an acoustic flowmeter and more particularly to such a flowmeter having improved accuracy, sensitivity and response time, achieved by narrow band signal processing.

Various systems have been developed for measuring the velocity of a fluid flow by utilizing the effect the fluid velocity will have on the transit time of an acoustic pulse transmitted along the direction of flow. One example of such a system uses a dual "sing-around" technique in which one series of pulses is transmitted in one direction, e.g. upstream, and another series of pulses is transmitted in the opposite direction, e.g. downstream. When each pulse in a series is received, it causes the next pulse to be transmitted in the same direction. Accordingly, the repetition rate of the pulses in each direction is predominantly determined by the transit time through the fluid medium. Since the transit time is affected by the flow velocity, the difference in frequency between the two series of pulses will reflect a measurement of fluid velocity.

The principal difficulty with this "sing-around" type of system is that the frequency difference will typically be very small as compared with the frequency itself and thus each of the sing-around oscillators must be stable to a very high degree of precision. Further, since the transmit signals are in the nature of pulses, broadband transducers and electronics are required which increase the difficulty of obtaining a satisfactory signal-to-noise ratio.

Further, since each of the oscillators must function in the nature of a phase lock loop, the presence of noise or turbulence in the fluid may cause a loss of the phase lock and a period during which the instrument is insensitive and there may even be a failure to recapture loop lock.

Among the several objects of the present invention may be noted the provision of an acoustic flowmeter which is capable of a high degree of precision; the provision of such a flowmeter which utilizes narrow band transducers and signal processing electronics; the provision of such a flowmeter which has a relatively short response time with respect to changes in fluid velocity; the provision of such a flowmeter which has an advantageous signal-to-noise ratio characteristic; the provision of such a flowmeter which is reliable and which is of relatively simple and inexpensive construction. Other objects and features will be in part apparent and in part pointed out hereinafter.

SUMMARY OF THE INVENTION

Briefly, acoustic flowmeter apparatus according to the present invention involves a pair of transducers located at upstream and downstream positions respectively relative to a conduit in which the flow velocity is to be measured. Interconnected with the transducers are signal generating, modulating and switching means for transmitting a modulated signal from one transducer to the other, alternately upstream and downstream, the signal transmitted in each direction comprising a gated burst of a measurement frequency repeated at a principal modulation frequency. The received signal is a delayed version of the transmitted signal, the delay being variable as a function of flow velocity. The downstream received signal is subjected to narrow band filtering to extract a first continuous sine-wave signal at the measurement frequency while the upstream received signal is similarly filtered to provide a second continuous sine-wave signal. Timing means are provided for measuring the difference in phase between the first and second continuous sine-wave signals. In the preferred embodiment, phase measurement is performed by first heterodyning the sine-wave signals to a much lower frequency, preserving phase information. The phase difference provides a measurement proportional to flow velocity.

In the preferred embodiment, the received signal is also applied to a detector means for extracting the modulation waveform to provide a first envelope signal and the upstream received signal is similarly processed to provide a second envelope signal. Each of the envelope signals is subjected to narrow band filtering for extracting the principal modulation frequency component to obtain respective envelope frequency sine-wave signals. Timing means are provided for measuring the difference in phase between the first and second envelope sine-wave signals. By comparing the first measurements with the square of the second, a value may be obtained which is proportional to the flow velocity.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
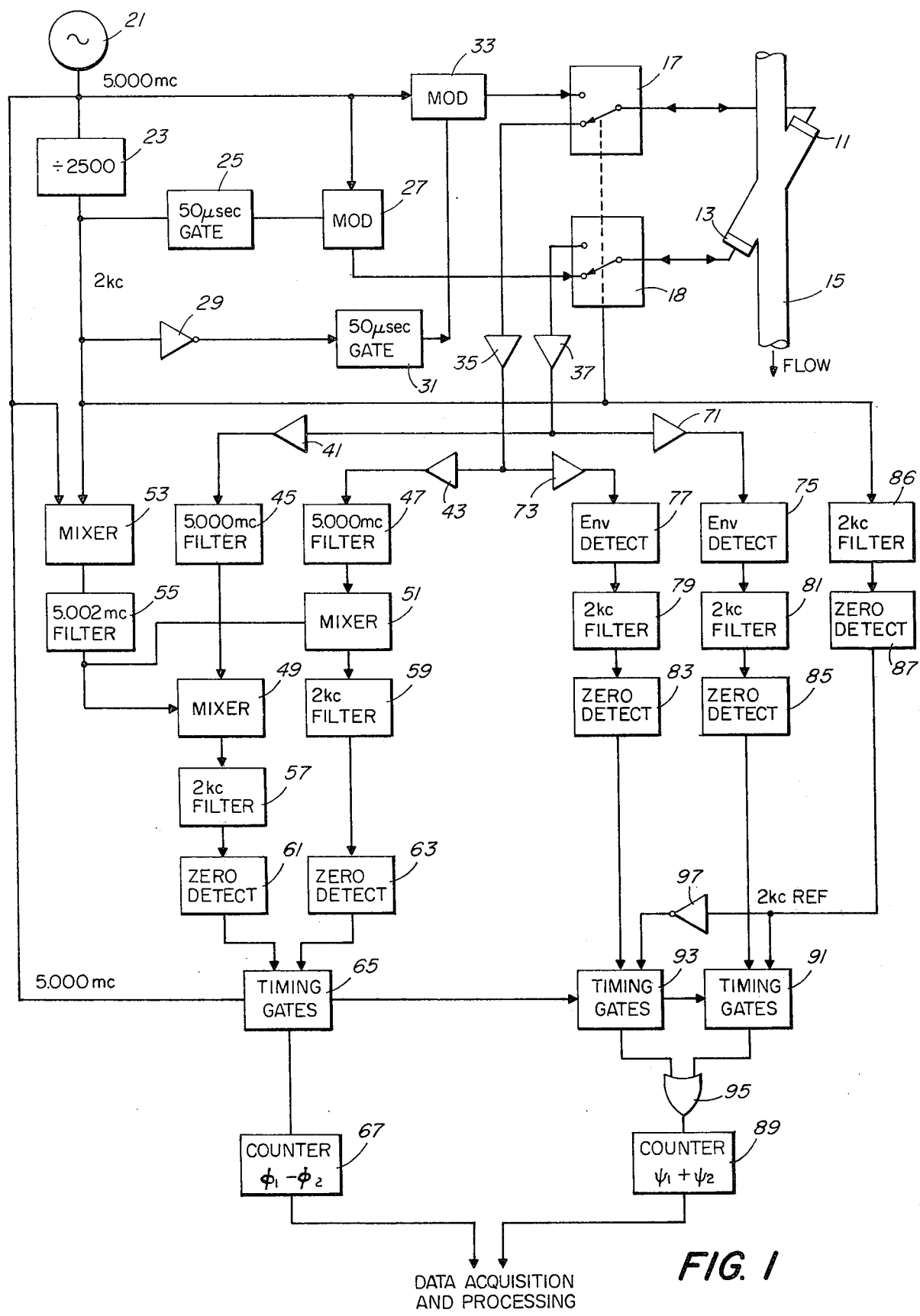
FIG. 1 is a functional block diagram of acoustic flowmeter apparatus constructed in accordance with the present invention.

As suggested previously, the flowmeter of the present invention operates by transmitting acoustic signals between two transducers which are located at upstream and downstream positions respectively relative to a conduit in which flow velocity is to be measured. Referring now to FIG. 1, such transducers are indicated at 11 and 13, the conduit carrying the flow to be measured being indicated at 15. In the embodiment illustrated herein, the various timing values and frequencies stated are appropriate for measuring the flow of a fluid such as jet engine fuel in a conduit having a diameter in the order of one-half inch.

As also indicated previously, the signals are transmitted alternately upstream and downstream, the same transducers being used in both directions. In FIG. 1, switching means are indicated at 17 and 18 for connecting each transducer alternately to a signal source and receiving circuitry. While the switching functions have been represented diagrammatically in mechanical fashion, it will be understood that conventional electronic switching circuitry will in fact be utilized.

A crystal-controlled, highly stable oscillator 21 provides an oscillatory signal at a frequency appropriate for measuring fluid velocities in the particular application. In the embodiment illustrated, this frequency is assumed to be 5 megacycles. This 5-megacycle signal also establishes the time base for the overall system.

The 5-megacycle signal is digitally divided down, as indicated at 23, to obtain a 2 kilocycle timing signal which is utilized, among other functions, for controlling the electronic switches 17 and 18 so as to effect periodic reversal of the operation of the transducers 11 and 13.

The 5-megacycle signal is gated or modulated to provide the burst signals which are transmitted upstream and downstream. For generating the upstream signal, the 2-kilocycle timing signal triggers a 50 microsecond gate 25 which in turn controls a modulating gate 27 which passes a corresponding burst of the 5-megacycle signal to the transducer 13 while the switch 18 is in the position shown. For the downstream signal, the 2kc clock timing signal is inverted as indicated at 29 to effect a 180° phase reversal, i.e. a 250 microsecond time displacement. This inverted signal triggers a 50 microsecond gate 31 controlling a modulation gate 33 which, in turn, passes a corresponding burst of the 5-megacycle signal to the transducer 11, i.e. during a period when the switches 17 and 18 are in positions opposite those shown in the drawing.

Figure 2:
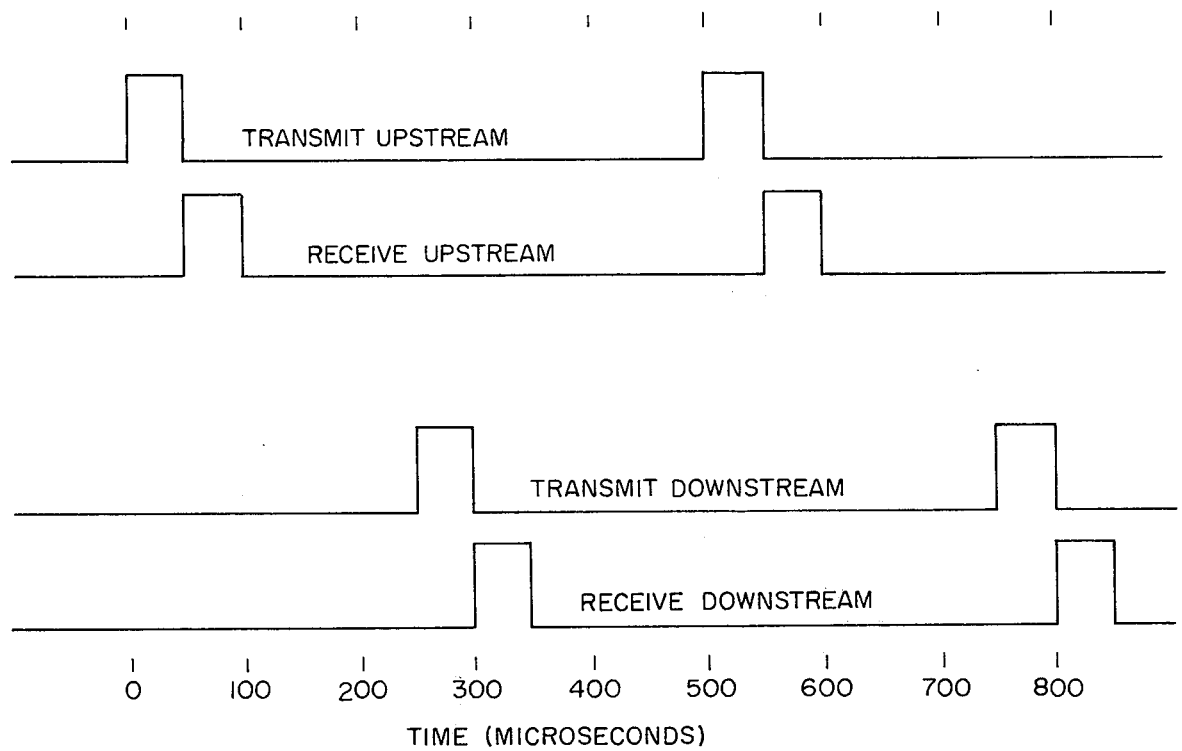
FIG. 2 is a diagrammatic representation of various waveforms occurring in the apparatus of FIG. 1.

Each transducer receives a delayed version of the signal transmitted by the other transducer, the delay being determined largely by the transit time of the signal through the fluid medium and determined incrementally by the velocity of that fluid. In the embodiment illustrated, the total transit time is assumed to be about 50 microseconds, a delay corresponding to a separation between the transducers of about three inches. The transmitted and received, upstream and downstream waveform envelopes are represented in FIG. 2 so that the sequence of operations may be more readily perceived.

The signals received at each transducer are processed to recover both the measurement frequency component, i.e. the 5-megacycle carrier frequency in this example, and the principal modulation frequency component, i.e. at 2 kilocycles, the processing in both cases being so as to preserve the phase information contained in the received signals. After passing through respective preamplifiers 35 and 37, the received signal from each transducer is applied, through a respective buffer amplifier 41 and 43, to a highly selective crystal filter 45 and 47 tuned to the 5-megacycle measurement frequency. In that the modulated waveform transmitted in each case is a gated burst, the received signal contains a substantial component at the carrier frequency. Accordingly, the output signal from each of the filters 45 and 47 will comprise an essentially pure sine-wave at the carrier frequency. Another way of analyzing this effect is to note that the modulation waveform contains a substantial d.c. component. Accordingly, the transmitted signal can be represented by a Fourier series having a significant zero-order component. While the filtering essentially eliminates the modulation generated by the transmission delay, it preserves the phase information in the recovered measurement frequency component.

The sine-wave signal obtained from each of the filters 45 and 47 is combined in a respective mixer 49 and 51 with a reference frequency signal of 5.002 megacycles. This reference signal is obtained by mixing, as indicated at 53, the 5.000 megacycle and 2 kilocycle timing signals and then filtering as indicated at 55 to obtain a pure 5.002 megacycle signal as a result of the heterodyne sum generated in the mixing process.

Mixing the five-megacycle component of each received signal with the 5.002 megacycle reference signal generates, by heterodyning, a 2 kilocycle signal in which the phase information present in the original 5-megacycle signal is preserved. In other words, an incremental change of 10 degrees in the phase of the 5-megacycle component of the received signal will produce a 10° phase change in the respective 2 kilocycle heterodyne product even though that phase change corresponds to a substantially longer time interval. In effect, a time scale magnification is obtained.

The 2 kilocycle heterodyne component obtained from each of the mixers 49 and 51 is selectively extracted by respective 2 kilocycle active filters 57 and 59. These 2 kilocycle sine-wave signals are in turn applied to respective zero crossing detector circuits 61 and 63 to obtain precise event signals suitable for time measurement purposes. These timing signals are employed to control a gating circuit 65 which selectively passes the 5-megacycle clock signal to a counter 67. The mode of operation of the timing gates is such that the number of clock pulses passed to the counter 67 will be proportional to the difference in phase between the upstream and downstream transmitted signals, taking into consideration only the measurement frequency component of each. Since the path length is the same for both the upstream and the downstream transmitted signals, any phase displacement between the upstream and downstream derived measurement frequency components would be due to movement of the fluid in the conduit which increases the signal transmission time in the upstream direction while decreasing it in the downstream direction. Thus, the number of counts passed to the counter 67 will be essentially proportional to the fluid velocity. As is understood, there will of course be various factors which enter into the proportionality or scale factor.

One of the elements which enters into the scale factor is the length of the transmission path and the speed of the acoustic wave through the particular fluid medium. These parameters also affect, in a similar manner, the total transit time for each signal to pass from the transmitting to the receiving transducer. In the preferred embodiment illustrated, means are also provided for measuring the sum of the transit times so that variations in ambient conditions, e.g. temperature, which affect both the transit times and the differential phase shifts may be directly taken into account by the flowmeter itself. For this purpose, the received signal from each transducer is applied, through a respective buffer amplifiers 71 and 73, to respective envelope detectors 75 and 77. These detectors operate to extract the modulation envelope, essentially eliminating the 5-megacycle measurement or carrier frequency component. The modulation envelope, being essentially a squarewave as transmitted, comprises many frequency components but the principal modulation component is the 2 kilocycle repetition frequency. This component is extracted from each channel by a 2 kilocycle active filter, 79 and 81 respectively.

The sinusoidal output signals from the filters 79 and 81 are applied to respective zero crossing detector circuits 83 and 85, again for the purpose of obtaining sharply defined events suitable for timing purposes. In order to obtain a measurement or count which varies or is proportional to the sum of the transit times, each timing signal is employed in conjunction with a 2 kilocycle timing reference signal to control the passage of 5-megacycle clock pulses to a counter. In order to minimize any time offsets occasioned by the filtering processes applied to the received signals, the 2kc timing signal obtained from the system clock is applied to a similar 2 kilocycle filter 86 and the sine-wave output from the filter is applied to a zero crossing detector circuit 87.

A counter 89 is arranged so that it can be advanced by clock pulses passed by either of two sets of timing gates 91 and 93, the passed pulses being applied through an OR gate 95 to the counter. The passage of clock pulses by the gate circuitry 91 is initiated by the 2 kilocycle reference signal and terminated by the envelope timing signal obtained from the zero detector 85 so as to pass a number of pulses proportional to the transit time in the downstream direction. The timing reference signal is inverted as indicated at 97 so as to effect a 250 microsecond time offset and the inverted signal is employed to initiate the passage of the clock pulses through the timing gates 93. This sequence of clock pulses is then terminated by the envelope timing signal obtained from the zero detector 83 which indicates the arrival of the received burst at the upstream transducer. The number of pulses in this string will thus be proportional to the transit time in the upstream direction. Accordingly, the sum of the pulses received by the counter 89 during each cycle of operation of the system will be proportional to the sum of the transit times in the upstream and downstream directions.

The values accumulated in the counters 67 and 89 are then provided to whatever data acquisition and processing apparatus may be appropriate to the particular application. Whether the counters 67 and 89 are reset at the end of each cycle of operation of the flowmeter or are allowed to accumulate over a much longer period of time will depend upon the needs of the system in which the flowmeter is incorporated as well as upon the degree of accuracy sought in the flow measurement. While the measurement of the sum of the transit time is useful in connection with establishing the scale factor for the velocity measurement, it will be understood by those skilled in the art that this measurement may also be useful in determining other parameters, e.g. fluid density, which may have utility apart from the flowmetering function.

As suggested previously, one principal advantage of the flowmeter of the present invention is that it utilizes narrow band signal-handling techniques which inherently afford improved signal-to-noise ratios. Further, since the system permits the use of a principal measurement frequency which is of relatively high frequency and thus relatively short wavelength, a relatively low rate of flow can produce a relatively large and therefore easily measured phase shift. While the use of a relatively high frequency affords this relatively sensitive change of phase shift with velocity, the heterodyning down of the received signal permits preservation of the phase information in an expanded time scale so that a digital and highly accurate measurement of the phase displacement can be made. In other words, the phase measurement need not be made at the higher frequency which was utilized to obtain sensitivity of phase shift. Again, this advantage is made possible by the narrow band and coherent mode of operation of the signal processing circuitry, the system being coherent in that the 5.002 megacycle reference signal with which the received measurement frequency signals are combined is derived from the same time base as the originally transmitted signal.

In situations where the highest degree of accuracy is desired, it may be useful to include, within the apparatus of the present invention, a switching mechanism for periodically reversing the connections between the transducers and the analog receiving circuitry and then averaging the results obtained with the two different connections. This periodic reversal and averaging can improve the accuracy of this system since it will cancel out any error due to differential phase shifts occurring between the highly selective crystal filters 45 and 47, which phase shifts might otherwise enter into and affect the overall accuracy of the system. This periodic reversal and averaging technique is not per se deemed to be novel but has a singular advantage in the apparatus of the present invention.

The mathematical theory of operation of the system is given below.

The phase shifts, $\phi_1$ and $\phi_2$, of the upstream and downstream waves, respectively, are given below:

$$\phi_1 = 2\pi f_o T_1 = \frac{2\pi f_o D}{\sin \theta} \frac{1}{c - v \cos \theta} \qquad \text{Eq. 1}$$

$$\phi_2 = 2\pi f_o T_2 = \frac{2\pi f_o D}{\sin \theta} \frac{1}{c + v \cos \theta} \qquad \text{Eq. 2}$$

where
 $f_o = 5$ MHz (the measurement frequency component),
 $\theta$ = angle of transmission path to conduit,
 $D$ = transmission path length,
 $c$ = sound speed, and
 $v$ = fluid velocity.
 $T_1$ and $T_2$ are the transit times in the upstream and downstream directions respectively.

The phase difference $(\phi_1 - \phi_2)$ is $$\phi_1 - \phi_2 = \frac{4\pi f_o D}{\sin \theta} \frac{v \cos \theta}{c^2 - v^2 \cos^2 \theta} \qquad \text{Eq. 3}$$

The frequency $f_o$ is chosen so that when $v = v_{max}$ the phase difference approaches but does not exceed 180°.

The high-frequency $(f_o)$ carrier wave is actually modulated by a rectangular pulse having a width of 50 microseconds and a repetition rate of 2 kHz $(f_m)$.

The phase shifts of the fundamental frequency (2 kHz) of the modulation waveforms are similarly given by $$\psi_1 = 2\pi f_m T_1 = \frac{2\pi f_m D}{\sin \theta} \frac{1}{c - v \cos \theta} \qquad \text{Eq. 4}$$

$$\psi_2 = 2\pi f_m T_2 = \frac{2\pi f_m D}{\sin \theta} \frac{1}{c + v \cos \theta} \qquad \text{Eq. 5}$$

The sum of these phase shifts $(\psi_1 + \psi_2)$ is $$\psi_1 + \psi_2 = \frac{4\pi f_m D}{\sin \theta} \frac{c}{c^2 - v^2 \cos^2 \theta} \qquad \text{Eq. 6}$$

Dividing Eq. 3 by Eq. 6:

$$\frac{\phi_1 - \phi_2}{\psi_1 + \psi_2} = \left(\frac{f_o}{f_m}\right)\left(\frac{v}{c}\right)\cos\theta \qquad \text{Eq. 7}$$

If we divide Eq. 7 by $(\psi_1 + \psi_2)$, we obtain $$\frac{\phi_1 - \phi_2}{(\psi_1 + \psi_2)^2} = v\left(\frac{f_o}{f_m^2}\right)\frac{\sin\theta\cos\theta}{4\pi D}\left[1 - \left(\frac{v}{c}\right)^2\cos^2\theta\right] \qquad \text{Eq. 8}$$

Even under the most extreme flow conditions, $(v/c)^2 <<< 1$, equation 8 can be simplified to $$\frac{\phi_1 - \phi_2}{(\psi_1 + \psi_2)^2} = v\left(\frac{f_o}{f_m^2}\right)\frac{\sin\theta\cos\theta}{4\pi D} \qquad \text{Eq. 9}$$

Thus, one can obtain an output proportional to flow velocity $v$, that is, by dividing the value accumulated in counter 67 by the square of the value accumulated in the counter 89, the flow velocity being essentially proportional to $\phi_1 - \phi_2$.

While the terms upstream and downstream have been utilized in the foregoing description and in the claims of this case, it will be understood that such designations are essentially arbitrary and that the flowmeter of the present invention will, in fact, operate for flow in either direction. Accordingly, the claims should be understood to cover such reversed flow conditions also.

As indicated above, the measurement frequency is preferably selected to produce a significant phase shift over the range of flow velocities expected in the particular application. In the embodiment illustrated, this same frequency is appropriate for the carrier frequency, i.e. the frequency which propagates across the liquid medium assumed to be present in the conduit. In other applications, the dimensions of the conduit and the nature of the fluid may be such that the desired measurement frequency would not be directly suitable for propagation. For example, the preferred measurement frequency might be subject to excess reverberation in the expected environment. In this case, the measurement frequency itself may be modulated onto a carrier frequency which is selected for its desirable propagation characteristics. For example, the flow of natural gas in an 18-inch pipeline might suggest a 5 kilocycle measurement frequency. As a carrier frequency, however, 5 kilocycles could be expected to produce excessive reverberation. Thus, in order to obtain a suitably directional propagation characteristic, it is useful to modulate the measurement frequency onto a 100 kilocycle carrier frequency. Apparatus operating in this fashion is illustrated in FIG. 3.

Figure 3:
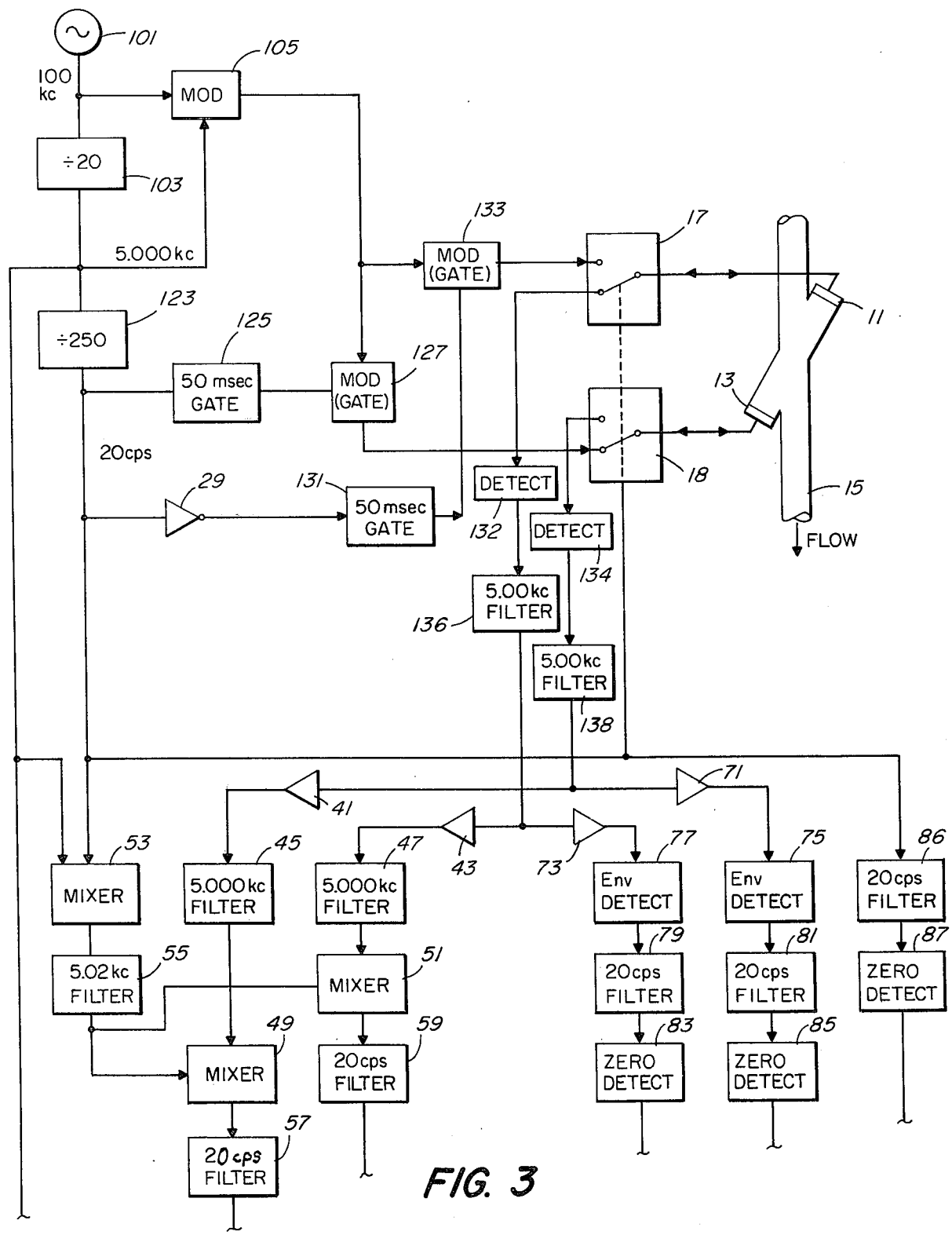
FIG. 3 is a functional block diagram of another embodiment of acoustic flowmeter apparatus of the present invention employing a carrier frequency different from the measurement frequency.

With reference to FIG. 3, a 100kc oscillator is indicated at 101. The 100-kilocycle time base is divided down as indicated at 103 to obtain a 5-kilocycle measurement frequency. The five-kilocycle measurement frequency is then modulated onto the 100-kilocycle carrier frequency as indicated at 105 and this composite signal is applied to the modulation gates 127 and 133 which time the gated pulses applied to the transducers. As may be seen, the modulation gates 127 and 133 correspond essentially to the modulation gates 27 and 33 of the embodiment of FIG. 1.

The 5-kilocycle measurement frequency is further divided down, as indicated at 123, to obtain a 20 c.p.s. signal which defines the repetition or primary envelope modulation frequency component, i.e. a burst gating corresponding to the modulation performed in the previous embodiment. This 20 c.p.s. signal controls timing gates 125 and 131 which perform essentially the same function as the timing gates 25 and 31 in the embodiment of FIG. 1, though the timing periods are lengthened in correspondence with the scaling of measurement and carrier frequencies to meet the different environment.

Prior to being applied to receiving circuitry similar to that illustrated in FIG. 1, the received pulses are applied to detectors 132 and 134 which recover the 5-kilocycle measurement frequency component, the phase information and basic envelope modulation waveforms being preserved. After filtering as indicated at 136 and 138, these measurement frequency components are applied to a receiver circuit which is essentially identical in configuration with the receiver circuitry of FIG. 1, though the various frequencies employed have been transposed as will be understood by those skilled in the art in correspondence with the descriptions above and as indicated on the drawing itself.

Again, it can be seen that the use of the measurement technique of the present invention allows a precise measurement to be obtained using a measurement frequency which is chosen essentially solely to facilitate the measurement, while carrier frequency and repetition rates may be selected essentially independently thereof.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. Acoustic flowmeter apparatus comprising:
    a pair of acoustic transducers located at upstream and downstream positions respectively relative to a conduit in which flow velocity is to be measured;
    signal generating, modulating and switching means interconnected with said transducers for transmitting a modulated signal from one transducer to the other, alternately upstream and downstream, the signal transmitted in each direction comprising a gated burst of a measurement frequency, repeated periodically, the received signal at the then non-transmitting transducer being a delayed version of the transmitted signal, the delay being variable as a function of the flow velocity;
    narrow band filter means for extracting the measurement frequency component from the downstream received modulated signal to provide a first continuous sine-wave signal;

narrow band filter means for extracting the measurement frequency component from the upstream received modulated signal to provide a second continuous sine-wave signal; and timing means for measuring the difference in phase directly between said first and second continuous sine-wave signals, the flow velocity being proportional to said measurement.

2. Acoustic flowmeter apparatus comprising:

a pair of acoustic transducers located at upstream and downstream positions respectively relative to a conduit in which flow velocity is to be measured;

signal generating, modulating and switching means interconnected with said transducers for transmitting a modulated signal from one transducer to the other, alternately upstream and downstream, the signal transmitted in each direction comprising a gated burst of a measurement frequency repeated at a principal modulation frequency, the received signal at the then non-transmitting transducer being a delayed version of the transmitted signal, the delay being variable as a function of the flow velocity;

narrow band filter means for extracting the measurement frequency component from the downstream received modulated signal to provide a first continuous sine-wave signal;

narrow band filter means for extracting the measurement frequency component from the upstream received modulated signal to provide a second continuous sine-wave signal;

timing means for measuring the difference in phase between said first and second continuous sine-wave signals;

detector means for extracting the modulation waveform of the downstream received signal to provide a first envelope signal; detector means for extracting the modulation waveform of the upstream received signal to provide a second envelope signal;

narrow band filter means for extracting the principal modulation frequency component from said first envelope signal to obtain a first envelope sine-wave signal;

narrow band filter means for extracting the principal modulation frequency component from said second envelope signal to obtain a second envelope sine-wave signal; and timing means for measuring the difference in phase between said first and second envelope sine-wave signals, the flow velocity being proportional to the ratio of the first measurement to the square of the second measurement.

3. Acoustic flowmeter apparatus comprising:

a pair of acoustic transducers located at upstream and downstream positions respectively relative to a conduit in which flow velocity is to be measured;

a stable frequency source;

signal generating, modulating and switching means interconnected with said transducers for transmitting a modulated signal from one transducer to the other, alternately upstream and downstream, the signal transmitted in each direction comprising a gated burst of a single measurement frequency derived from said source, repeated periodically, the received signal at the then non-transmitting transducer being a delayed version of the transmitted signal, the delay being variable as a function of the flow velocity;

narrow band filter means for extracting the measurement frequency component from the downstream received modulated signal to provide a first continuous sine-wave signal;

narrow band filter means for extracting the measurement frequency component from the upstream received modulated signal to provide a second continuous sine-wave signal;

means for deriving from said source a reference signal of a frequency differing by a small percentage from the transmitted measurement frequency;

means for mixing each of said continuous sine-wave signals with said reference signal to generate a respective difference frequency heterodyne signal preserving the phase information in the respective sine-wave signal; and means for measuring the difference in phase between said heterodyne signals, the flow velocity being proportional to said measurement.

4. Acoustic flowmeter apparatus comprising:

a pair of acoustic transducers located at upstream and downstream positions respectively relative to a conduit in which flow velocity is to be measured;

a stable frequency source;

signal generating, modulating and switching means interconnected with said transducers for transmitting a modulated signal from one transducer to the other, alternately upstream and downstream, the signal transmitted in each direction comprising a gated burst of a single measurement frequency derived from said source, repeated at a principal modulation frequency, the received signal at the then non-transmitting transducer being a delayed version of the transmitted signal, the delay being variable as a function of the flow velocity;

narrow band filter means for extracting the measurement frequency component from the downstream received modulated signal to provide a first continuous sine-wave signal;

narrow band filter means for extracting the measurement frequency component from the upstream received modulated signal to provide a second continuous sine-wave signal;

means for deriving from said source a reference signal of a frequency differing by a small percentage from the transmitted measurement frequency;

means for mixing each of said continuous sine-wave signals with said reference signal to generate a respective difference frequency heterodyne signal preserving the phase information in the respective sine-wave signal;

means for measuring the difference in phase between said heterodyne signals;

detector means for extracting the modulation waveform of the downstream received signal to provide a first envelope signal;

detector means for extracting the modulation waveform of the upstream received signal to provide a second envelope signal;

narrow band filter means for extracting the principal modulation frequency component from said first envelope signal to obtain a first envelope sine-wave signal;

narrow band filter means for extracting the principal modulation frequency component from said second envelope signal to obtain a second envelope sine-wave signal; and timing means for measuring the difference in phase between said first and second envelope sine-wave signals, the flow velocity being proportional to the ratio of the first said measurement to the square of the second said measurement.

5. Acoustic flowmeter apparatus comprising:

a pair of acoustic transducers located at upstream and downstream positions respectively relative to a conduit in which flow velocity is to be measured;

a stable frequency source providing a signal of relatively high frequency $F_o$;

means for counting down from frequency $F_o$ to provide a squarewave timing signal of relatively low frequency $F_m$;

signal generating, modulating and switching means interconnected with said transducers for transmitting a modulated signal from one transducer to the other, alternately upstream and downstream, the signal transmitted in each direction comprising a gated burst of a frequency $F_o$, repeated at a principal modulation frequency equal to $F_m$, the received signal at the then non-transmitting transducer being a delayed version of the transmitted signal, the delay being variable as a function of the flow velocity;

narrow band filter means for extracting the measurement frequency component from the downstream received modulated signal to provide a first continuous sine-wave signal;

narrow band filter means for extracting the measurement frequency component from the upstream received modulated signal to provide a second continuous sine-wave signal;

means for combining and filtering signals of frequencies $F_o$ and $F_m$ to obtain a reference signal of a frequency $F_o$ and $F_m$ differing by a small percentage from the transmitted frequency $F_o$;

means for mixing each of said continuous sine-wave signals with said reference signal and filtering the respective product to generate a respective sine-wave difference frequency heterodyne signal of frequency $F_m$ preserving the phase information in the respective sine-wave signal of frequency $F_o$;

a respective zero crossing detector for each sine-wave heterodyne signal;

digital timing means controlled by said zero crossing detectors for measuring the phase displacement between said heterodyne signals;

detector means for extracting the modulation waveform of the downstream received signal to provide a first envelope signal;

detector means for extracting the modulation waveform of the upstream received signal to provide a second envelope signal;

narrow band filter means for extracting the $F_m$ frequency component from said first envelope signal to obtain a first envelope sine-wave signal;

narrow band filter means for extracting the $F_m$ frequency component from said second envelope signal to obtain a second envelope sine-wave signal;

timing means for measuring the difference in phase between said first and second envelope sine-wave signals, the flow velocity being proportional to the ratio of the first said measurement to the square of the second said measurement;

a respective zero crossing detector for each envelope sine-wave signal;

narrow band filter means for extracting the $F_m$ frequency component from said square wave timing signal of frequency $F_m$ to obtain a low frequency sine-wave reference signal;

a zero crossing detector for said sine-wave reference signal; and digital timing means controlled by said envelope signal zero crossing detectors and said reference signal zero crossing detector for measuring the phase displacement between each of said envelope signals and said low frequency reference signal.

6. Acoustic flowmeter apparatus comprising:

a pair of acoustic transducers located at upstream and downstream positions respectively relative to a conduit in which flow velocity is to be measured;

means for generating a signal at a carrier frequency selected for its transmission characteristics in the medium whose flow is to be measured;

means for generating a signal at a measurement frequency, lower than said carrier frequency, selected for facilitating measurement of phase shift during transmission across the flowing medium;

means for modulating said carrier frequency with said measurement frequency thereby to generate a composite signal;

signal modulating and switching means interconnected with said transducers for transmitting a modulated signal from one transducer to the other, alternately upstream and downstream, the signal transmitted in each direction comprising a gated burst of said composite signal, repeated periodically, the received signal at the then non-transmitting transducer being a delayed version of the transmitted signal, the delay being variable as a function of the flow velocity;

detecting means for extracting the measurement frequency component from the downstream received modulated signal to provide a first continuous sine-wave signal;

detecting means for extracting the measurement frequency component from the upstream received modulated signal to provide a second continuous sine-wave signal; and timing means for measuring the difference in phase directly between said first and second continuous sine-wave signals, the flow velocity being proportional to said measurement.

7. Acoustic flowmeter apparatus comprising:

a pair of acoustic transducers located at upstream and downstream positions respectively relative to a conduit in which flow velocity is to be measured;

means for generating a signal at a carrier frequency selected for its transmission characteristics in the medium whose flow is to be measured;

means for generating a signal at a measurement frequency, lower than said carrier frequency, selected for facilitating measurement of phase shift during transmission across the flowing medium;

means for modulating said carrier frequency with said measurement frequency thereby to generate a composite signal;

signal modulating and switching means interconnected with said transducers for transmitting a modulated signal from one transducer to the other, alternately upstream and downstream, the signal transmitted in each direction comprising a gated burst of said composite repeated at a principal modulation frequency, the received signal at the then non-transmitting transducer being a delayed version of the transmitted signal, the delay being variable as a function of the flow velocity;

detector means for extracting the measurement frequency component from the downstream received modulated signal;

filter means operative on the measurement frequency component of the downstream received signal to provide a first continuous sine-wave signal at said measurement frequency;

detector means for extracting the measurement frequency component from the upstream received modulated signal;

filter means operative on the measurement frequency component of the upstream received signal to provide a second continuous sine-wave signal at said measurement frequency;

timing means for measuring the difference in phase between said first and second continuous sine-wave signals;

detector means for extracting the modulation waveform of the downstream received signal to provide a first envelope signal;

detector means for extracting the modulation waveform of the upstream received signal to provide a second envelope signal;

narrow band filter means for extracting the principal modulation frequency component from said first envelope signal to obtain a first envelope sine-wave signal;

narrow band filter means for extracting the principal modulation frequency component from said second envelope signal to obtain a second envelope sine-wave signal; and timing means for measuring the difference in phase between said first and second envelope sine-wave signals, the flow velocity being proportional to the ratio of the first measurement to the square of the second measurement.

8. Apparatus as set forth in claim 7 wherein said timing means for measuring the difference in phase between said first and second continuous sine-wave signals includes:

means for heterodyning each sine-wave signal to a substantially lower frequency, preserving phase information;

means for detecting the zero crossings of the respective lower frequency signals; and means for timing the interval between the respective zero crossings.

* * * * *